United States Patent
Bergman

(10) Patent No.: US 10,375,195 B2
(45) Date of Patent: Aug. 6, 2019

(54) CONTENT NODE SELECTION USING NETWORK PERFORMANCE PROFILES

(71) Applicant: Fastly, Inc., San Francisco, CA (US)

(72) Inventor: Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 14/485,174

(22) Filed: Sep. 12, 2014

(65) Prior Publication Data

US 2015/0127765 A1    May 7, 2015

Related U.S. Application Data

(60) Provisional application No. 61/900,481, filed on Nov. 6, 2013.

(51) Int. Cl.
| | | |
|---|---|---|
| *G06F 15/167* | (2006.01) | |
| *H04L 29/08* | (2006.01) | |
| *H04L 12/721* | (2013.01) | |
| *H04L 29/12* | (2006.01) | |

(52) U.S. Cl.
CPC .......... *H04L 67/2842* (2013.01); *H04L 45/14* (2013.01); *H04L 61/1511* (2013.01); *H04L 67/16* (2013.01)

(58) Field of Classification Search
CPC . H04L 67/2842; H04L 45/14; H04L 61/1511; H04L 67/16
USPC .......................... 709/213, 203, 217, 223, 224
See application file for complete search history.

(56) References Cited

U.S. PATENT DOCUMENTS

| | | | | |
|---|---|---|---|---|
| 7,296,083 B2 * | 11/2007 | Barham | .............. | H04L 12/2602 370/229 |
| 7,555,542 B1 * | 6/2009 | Ayers | ...................... | H04L 29/06 709/220 |
| 7,631,034 B1 * | 12/2009 | Haustein | ................. | G06F 9/505 709/201 |
| 7,653,689 B1 | 1/2010 | Champagne et al. | | |
| 7,742,418 B2 * | 6/2010 | Westerberg | ......... | H04L 43/0858 370/235 |
| 8,909,736 B1 * | 12/2014 | Bosch | ................. | H04L 67/1093 709/217 |
| 9,246,965 B1 * | 1/2016 | Stoica | ..................... | H04L 65/80 |
| 2003/0005152 A1 | 1/2003 | Diwan et al. | | |
| 2003/0065763 A1 | 4/2003 | Swildens et al. | | |
| 2003/0099202 A1 * | 5/2003 | Lear | .................. | H04L 29/06027 370/238 |
| 2008/0215718 A1 * | 9/2008 | Stolorz | ............... | H04L 61/1511 709/223 |
| 2010/0125675 A1 | 5/2010 | Richardson et al. | | |
| 2011/0295942 A1 | 12/2011 | Raghunath et al. | | |

(Continued)

*Primary Examiner* — Liang Che A Wang
*Assistant Examiner* — Kaylee J Huang

(57) ABSTRACT

A communication system exchanges communications between end user devices, content delivery nodes (CDN) of a content delivery system, and a control system that selects CDNs of the content delivery system. The control system receives a domain name lookup request issued by an end user device for retrieving content cached by one or more CDNs of the content delivery system. The control system associates the end user device with a network performance profile to select a CDN of the content delivery system. The control system transfers a network address associated with the selected CDN for receipt by the end user device responsive to the domain name lookup request.

13 Claims, 6 Drawing Sheets

(56) References Cited

U.S. PATENT DOCUMENTS

| | | |
|---|---|---|
| 2012/0117240 A1 | 5/2012 | Omar |
| 2012/0254421 A1 | 10/2012 | Gagliardi et al. |
| 2012/0290693 A1* | 11/2012 | Karasaridis ......... H04L 61/1511 709/222 |
| 2012/0324113 A1* | 12/2012 | Prince ................. H04L 67/2814 709/226 |
| 2013/0018978 A1 | 1/2013 | Crowe et al. |
| 2013/0060893 A1 | 3/2013 | Harvell et al. |
| 2013/0097309 A1* | 4/2013 | Ma ..................... H04L 29/08099 709/224 |
| 2013/0132560 A1* | 5/2013 | Hudzia ................. H04L 47/283 709/224 |
| 2013/0282864 A1* | 10/2013 | Richardson ............. H04L 67/18 709/217 |
| 2016/0080319 A1* | 3/2016 | Steele ................. H04L 61/2517 709/228 |

\* cited by examiner

CONTENT NODE SELECTION USING NETWORK PERFORMANCE PROFILES

RELATED APPLICATIONS

This application hereby claims the benefit of and priority to U.S. Provisional Patent Application 61/900,481, titled "CONTENT DELIVERY NODE SELECTION BASED ON PREDICTED NETWORK PERFORMANCE," filed Nov. 6, 2013, and which is hereby incorporated by reference in its entirety.

TECHNICAL FIELD

Aspects of the disclosure are related to the field of communication networks, and in particular routing of content over communication networks.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, which is handled through a content delivery node, the content delivery node is configured to respond to the end user requests instead of the origin servers. In this manner, a content delivery node can act as a proxy for the origin servers. However, when a content delivery node communicates over different communication service providers, such as Internet Service Providers (ISPs), the various ISPs and other packet networks over which end user content requests and content delivery are handled can add additional slowdowns and latency issues.

Overview

A communication system exchanges communications between end user devices, content delivery nodes (CDN) of a content delivery system, and a control system that selects CDNs of the content delivery system. The control system receives a domain name lookup request issued by an end user device for retrieving content cached by one or more CDNs of the content delivery system. The control system associates the end user device with a network performance profile to select a CDN of the content delivery system. The control system transfers a network address associated with the selected CDN for receipt by the end user device responsive to the domain name lookup request.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Network content, such as web page content, typically includes content such as text, hypertext markup language (HTML) pages, pictures, video, audio, code, scripts, or other content viewable by an end user in a browser or other application. Network content may be provided from static files or dynamically generated upon request. Network content includes example website content referenced in FIGS. 1, 3, and 4, such as "www.gamma.gov," "www.alpha.com," and "www.beta.net," among others.

Figure 1:
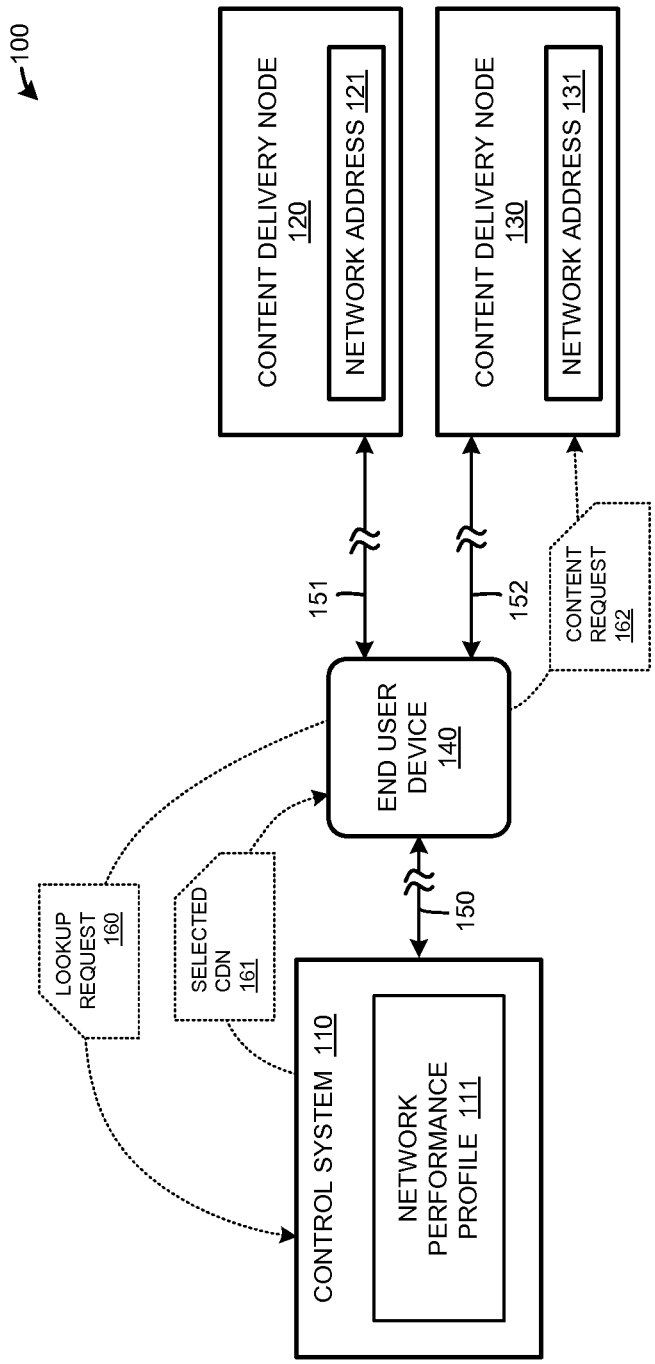
FIG. 1 is a system diagram illustrating a communication system.

As a first example employing a control system, FIG. 1 is presented. FIG. 1 is a system diagram illustrating communication system 100. Communication system 100 includes content delivery nodes 120 and 130, control system 110 and end user device 140. Content delivery nodes 120 and 130 may each include a web server, an Internet file server such as an FTP file server or HTTP file server, an application server, a database server, or any other remote server system that provides content in response to network requests.

End user device 140 is representative of an end user device which can request and receive network content. Any number of end user devices can make content requests to several content delivery nodes, such as content delivery nodes 120 and 130. Content delivery nodes 120 and 130 have cached copies of some content, such as the contents of domain "www.gamma.gov." Replicated caching enables end user device 140 to get the same content from either of content delivery nodes 120 and 130.

Control system 110 has network performance profile 111 and perhaps other network performance profiles. A network performance profile has performance data that may regard packet transit time, throughput, response latency, connection establishment delay, price, or a combination of these. The data of a network performance profile may be based on past or present measurements made by end user devices, control server 110, content delivery nodes 120 and 130, or some other device that can communicate with content delivery nodes 120 and 130 over network link 151-152 respectively. Measurements may be made using content requests, ICMP pings, traceroute, or other network interactions. Measurements may be raw or derived and consider statistical concepts, such as peak, mean, median, etc.

To further illustrate FIG. 1, a brief description of the operation of communication system 100 is included. In operation, end user device 140 attempts to retrieve content by issuing lookup request 160 to control system 110 over at least network link 150. End user device 140 has network characteristics, such as a network address or a service provider. These network characteristics of end user device 140 may be analyzed by control system 110 to identify a network performance profile. In this example control system 110 associates network performance profile 111 with end user device 140.

Control system 110 may use network performance profile 111 to predict the performance of network routes between end user device 140 and each of the available cache nodes, such as content delivery nodes 120 and 130. When end user device 140 issues lookup request 160 to control system 110, control system 110 processes network performance profile 111 and lookup request 160 to select a content delivery node to provide content to end user device 140. Since some content is cached, control system 110 may select either of content delivery nodes 120 and 130, which are reachable at network addresses 121 and 131 respectively. Although network addresses 121 and 131 can reach the same cached content, a content request destined for network address 121 is transferred over a different network route than a content request destined for network address 131. Because control system 110 identifies and processes some predicted network performance, control system 110 may select either of content delivery nodes 120 and 130 depending on which network route is expected to perform better for end user device 140. In this example control system 110 responds to lookup request 160 by selecting content delivery node 130. Control system 110 transfers network address 131 for receipt by end user device 140 over network link 150, with the transfer shown as selected CDN 161 in FIG. 1.

Upon receipt of the selected network address 131, end user device 140 issues content request 162 using that address. Content delivery node 130 then receives content request 162 at network address 131 over network link 152. Responsive to the content request, content delivery node 130 delivers the content requested by end user device 140. For example, if the content requested is associated with www.gamma.gov, then content delivery node 130 responsively transfers some of the content for www.gamma.gov for delivery to end user device 140. Content delivery node 130 and end user device 140 may measure and report some network performance data to control system 110. Control system 110 may use reported network performance data that it receives to update network performance profile 111.

Figure 2:
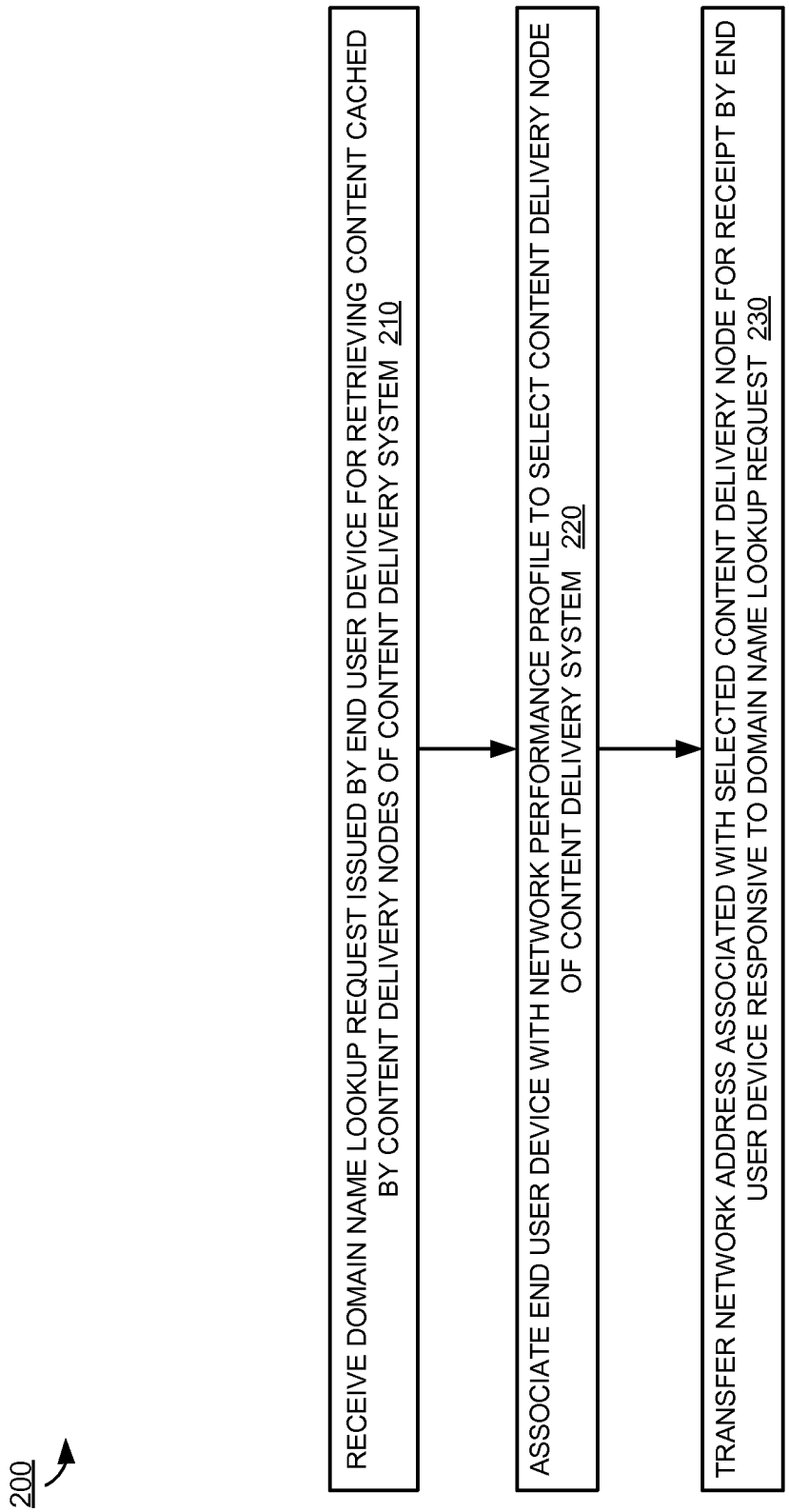
FIG. 2 is a flow diagram illustrating an method of operating a communication system.

FIG. 2 illustrates the operation of control system 110 that selects a content delivery node. Control system 110 receives (210) lookup request 160 issued by end user device 140 for retrieving content cached by CDNs 120, 130, and other CDNs of a content delivery system. Control system 110 associates (220) end user device 140 with network performance profile 111 to select content delivery node 130 of the content delivery system. Control system 110 transfers (230) network address 131 associated with selected content delivery node 130 for receipt by end user device 140 responsive to lookup request 160.

Figure 3:
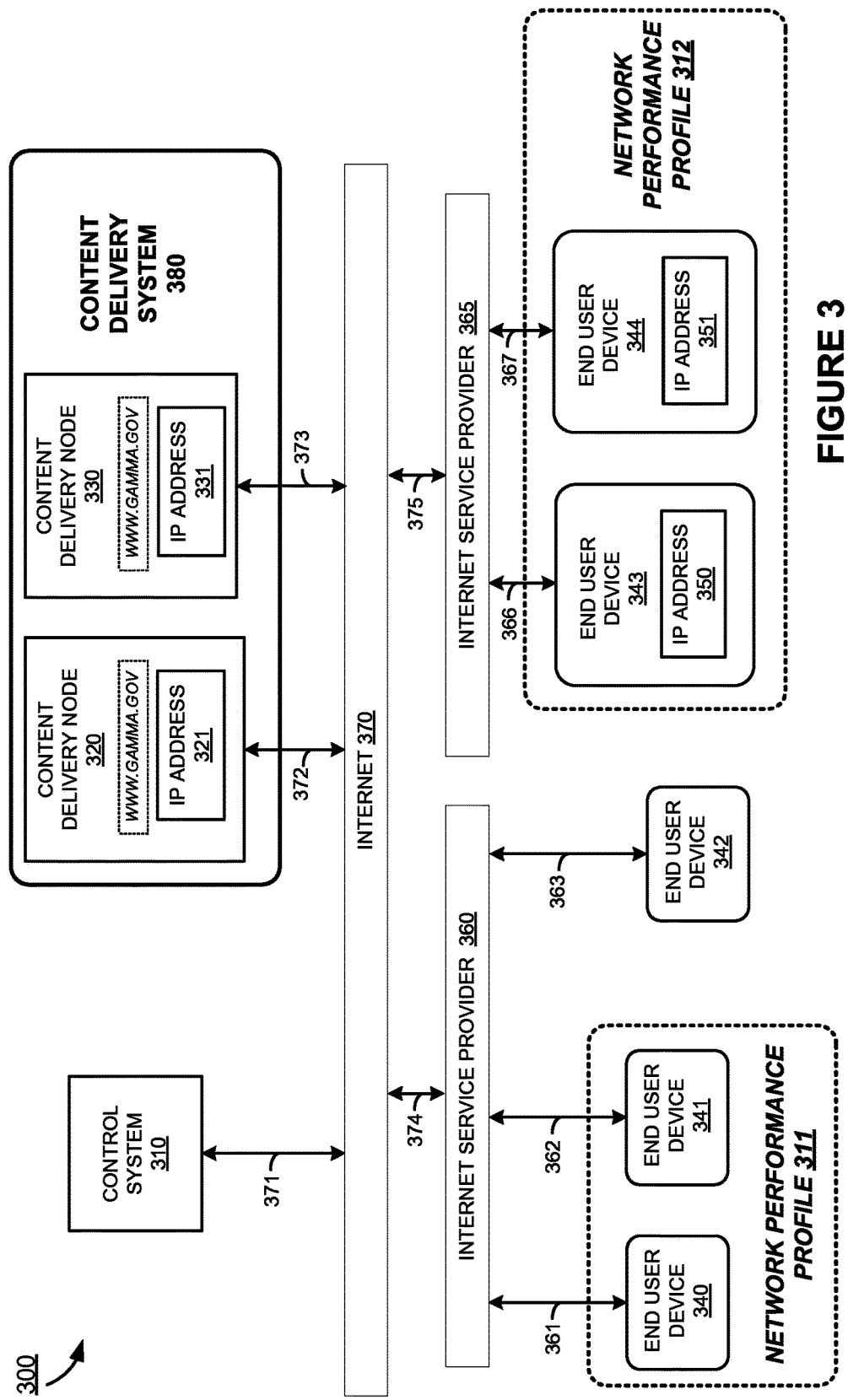
FIG. 3 is a system diagram illustrating a communication system.

As another example employing a control system, FIG. 3 is presented. FIG. 3 is a system diagram illustrating communication system 300. Communication system 300 includes end user devices 340-344, internet service providers 360 and 365, internet 370, content delivery system 380, and control system 310. Within content delivery system 380 are many content delivery nodes, including content delivery nodes (CDN) 320 and 330. Any number of end user devices may ask control system 310 to select a content delivery node for a content request. Requests and content are exchanged over internet 370. In this example, internet 370 may be the global Internet. Communication between end user devices and CDNs may pass through any of ISP 360, internet 370, and network links 372-376.

End user devices 340-341 and 343-344 request and receive content from CDNs 320 and 330. In this implementation, end user devices, CDNs, or both measure the transfer performance of data exchanged. A transfer performance measurement may regard packet transit time, throughput, response latency, connection establishment delay, or any network measurement of relative fitness for content delivery. End user devices and CDNs send their transfer performance measurements to control system 310 over network link 371. For example, JavaScript in the web browser of an end user device could measure the connection establishment delay, round trip latency, and throughput of an HTTP connection between the end user device and the CDN. An end user device may send a transfer performance measurement directly to control system 310 or indirectly through a CDN which then forwards the transfer performance measurement to control system 310. For example an end user device may send a content request having a cookie or parameter that includes a transfer performance measurement that the end user device made.

Control system 310 uses the transfer performance measurements that it receives to create and maintain network performance profiles. Each network performance profile has identifying characteristics and transfer performance data, such as transfer performance measurements or scores derived from measurements. The scores and measurements of a network performance profile enable control system 310 to select a CDN having the best predicted network performance for content retrieval by any end user device with network characteristics that match the identifying characteristics of the network performance profile. A network performance profile may be identified by one or more network characteristics such as an IP address range, an ISP, or performance characteristics such as latency. When control system 310 receives a network performance measurement, control system 310 uses the measurement to update the transfer performance data of one or more network performance profiles. In this way network performance profiles are kept current with dynamic conditions, such as network weather.

In this example, control system 310 creates a network performance profile 311 to track the transfer performance of CDNs while serving content to end user devices through ISP 360. Because end user devices 340-341 connect to content delivery system 380 through network links 361-362 respectively and through ISP 360, the transfer performance measurements of end user devices 340-341 are used by control system 310 to update network performance profile 311.

End user devices 343-344 also send transfer performance measurements to control system 310, over network links 366-367 respectively. End user devices 343-344 connect to internet 370 through ISP 365 and over network link 375. Because end user devices 343-344 do not use ISP 360, control system 310 does not use their transfer performance measurements to update network performance profile 311. However control system 310 also has network performance profile 312 for end user devices having an IP address within a given address range. End user devices 343-344 have IP addresses 350-351 respectively. In this example, IP addresses 350-351 are included within the address range that identifies network performance profile 312. As such control system 310 uses the transfer performance measurements of end user devices 343-344 to update network performance profile 312.

End user device 342 is a recent addition to communication system 300, has not communicated with control system 310 and content delivery system 380, and has not been associated with a network performance profile. Although control system 310 has no prior knowledge of end user device 342, control system 310 can select a CDN that is expected to have the best network performance for end user device 342. When network content is needed, end user device 342 sends a domain name lookup request to control system 310. Control system 310 receives the lookup request and notices that it came through ISP 360. ISP 360 is the identifying characteristic of network performance profile 311. As such control system 310 associates end user device 342 with network performance profile 311. In this example, network performance profile 311 has network performance data indicating that CDN 320 has better network performance than CDN 330 for serving content through ISP 360. Control system 310 uses network performance profile 311 to select CDN 320 for end user device 342. CDN 320 has IP address 321. Control system 310 responds to this lookup request by sending IP address 321 for use by end user device 342.

Figure 4:
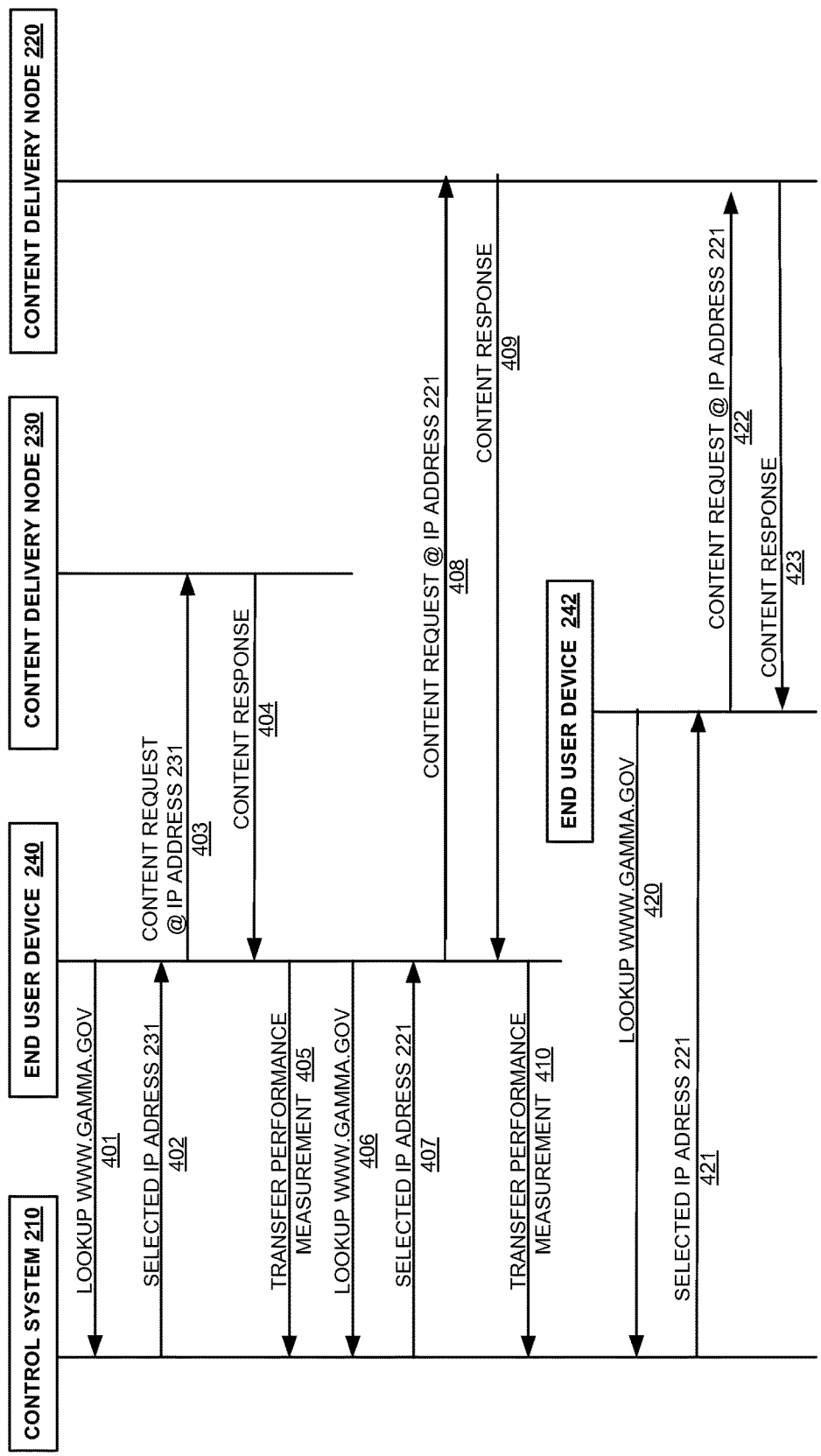
FIG. 4 is a sequence diagram illustrating an example method of operating a communication system.

FIG. 4 is a sequence diagram illustrating a method of operating FIG. 3. It should be understood that the operations of FIG. 4 can also be applied to similar elements of FIG. 1. Elements shown in FIG. 4 operate to select CDNs and use their network addresses in communication system 300. FIG. 1's communication system 100 may also perform the behavior shown in FIG. 4. FIG. 4 shows a sequence of interactions that occur in two phases. The first phase involves end user device 340 and interactions 401-410. Control system 310 uses transfer performance measurements made in this first phase to update network performance profile 311. Interactions 420-423 occur during the second phase. During the second phase, control system 310 uses network performance profile 311 to select a CDN for end user device 342.

During operation, end user device 340 attempts to retrieve cached content, perhaps for a web browser or other end user application. The content can be presented to end user device 340 using a domain name, such as www.gamma gov, and end user device 340 first must translate the domain name into a network address, such as an IP address, along with directory or path information. To translate the domain name, end user device 340 issues (401) a domain name lookup request, which is received by control system 310.

Control system 310 selects CDN 330, which has IP address 331. Control system 310 transfers (402) IP address 331 to end user device 340. End user device 340 sends (403) a content request to IP address 331. CDN 330 receives the content request and responds by sending (404) content to end user device 340. End user device 340 measures the network transfer performance of this exchange with CDN 330 and transfers (405) the measurements to control system 310. Because end user device 340 connects to content delivery system 380 through ISP 360, the transfer performance measurements of end user device 340 is used by control system 310 to update network performance profile 311.

End user device transfers (406) another lookup request to control system 310. This time, control system 310 selects a different CDN, 320, to serve the same end user device, 340. CDN 320 has IP address 321. Control system 310 transfers (407) IP address 321 to end user device 340, which end user device 340 uses to request (408) and receive (409) content from CDN 320. End user device 340 measures the network transfer performance of this exchange with CDN 320 and transfers (410) the measurement to control system 310. Control system 310 uses the measurement to update network performance profile 311.

Another end user device, 342, transfers (420) a lookup request to control system 310. Because end user device 342 connects to content delivery system 380 through ISP 360, control system 310 associates end user device 342 with network performance profile 311. In this example, network performance profile 311 has network performance data indicating that CDN 320 has better network performance than CDN 330 for serving content through ISP 360. Control system 310 uses network performance profile 311 to select CDN 320 for end user device 342. CDN 320 has IP address 321. Control system 310 responds (421) to this lookup request by sending IP address 321 for use by end user device 342. End user device 340 uses to request (422) and receive (423) content from CDN 320.

Figure 5:
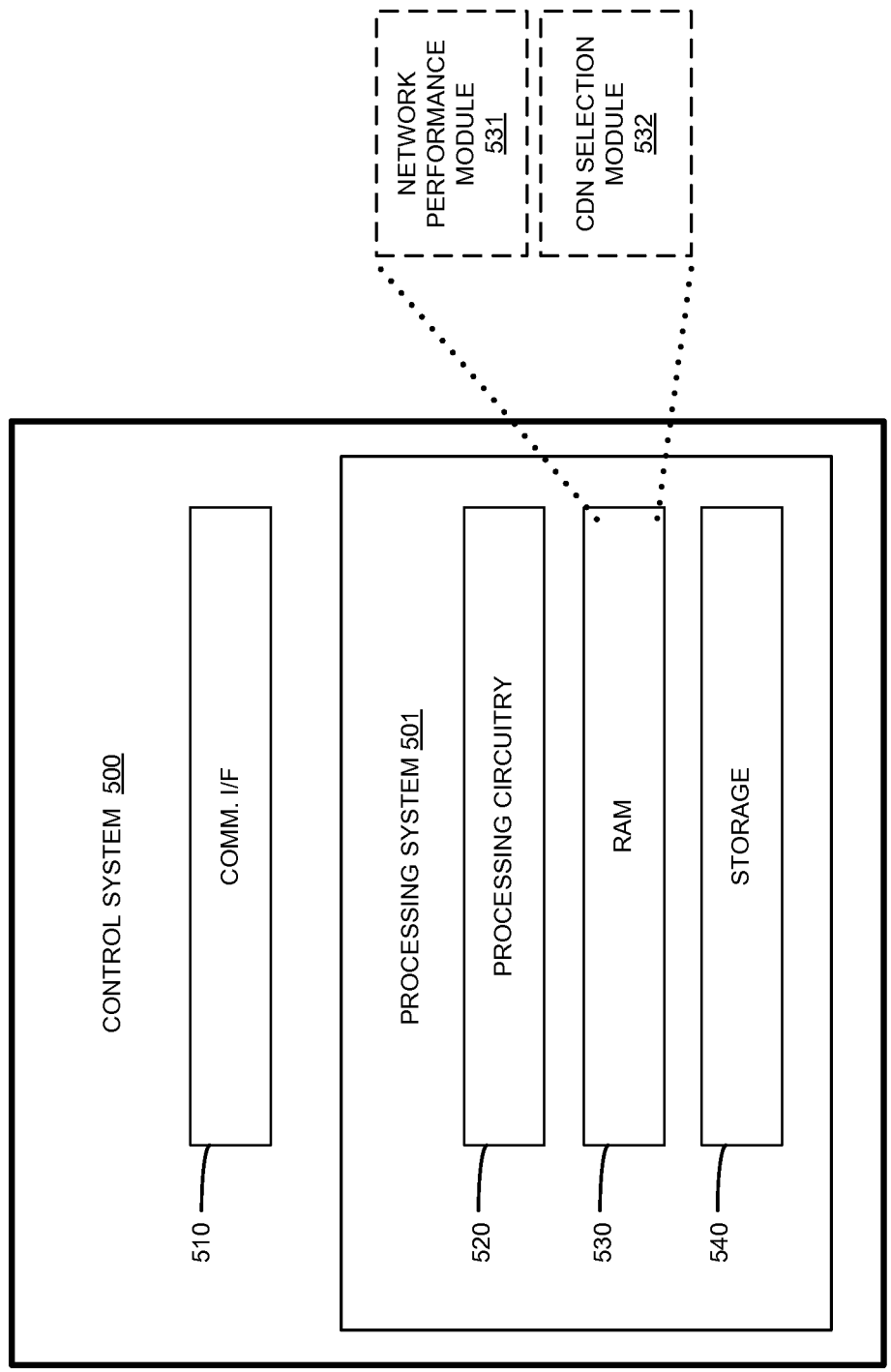
FIG. 5 is block diagram illustrating a control system.

FIG. 5 illustrates the internal configuration of control system 500. Control system 500 may be an implementation of control systems 110 and 310. Control systems 110 and 310 may have different internal configurations. Control system 500 comprises communication interface 510, and processing system 501. Processing system 501 includes processing circuitry 520, RAM 530, and storage 540. Processing system 501 is linked to communication interface 510. Processing system 501 includes processing circuitry 520 which is connected to RAM 530 that stores operating software. Control system 500 may include other well-known components such as an enclosure that are not shown for clarity.

Processing system 501 can be implemented within a single processing device but can also be distributed across multiple processing devices or sub-systems that cooperate in executing program instructions. Examples of processing system 501 include general purpose central processing units, microprocessors, application specific processors, and logic devices, as well as any other type of processing device.

Communication interface 510 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 510 include network interface card equipment, transceivers, modems, and other communication circuitry. In some examples, communication interface 510 receives domain name lookup requests issued by end user devices and transfers network addresses associated with content delivery nodes for receipt by end user devices responsive to domain name lookup requests.

RAM 530 and storage 540 can each comprise any non-transitory storage media readable by processing system 501 and capable of storing software. RAM 530 can include volatile and nonvolatile, removable and non-removable media implemented in any method or technology for storage of information, such as computer readable instructions, data structures, program modules, or other data. Storage 540 can include non-volatile storage media, such as solid state storage media, flash memory, or solid state storage system. RAM 530 and storage 540 can each be implemented as a single storage device but can also be implemented across multiple storage devices or sub-systems. RAM 530 and storage 540 can each comprise additional elements, such as controllers, capable of communicating with processing system 501. In some implementations, the storage media can be a non-transitory storage media.

Software stored on or in RAM 530 or storage 540 can comprise computer program instructions, firmware, or some other form of machine-readable processing instructions having processes that when executed by processing system 501 direct control system 500 to receiving domain name lookup requests, associate the end user devices with network performance profiles to select content delivery nodes, and transfer network addresses associated with the selected content delivery nodes, among other operations. RAM 530 stores logic and other software for modules 531-532 as shown, although other implementations may use different modules. Network performance module 531 creates and updates network performance profiles. CDN selection module 532 associates end user devices with network performance profiles to select content delivery nodes, selects a content delivery node based on the network performance profiles. The software can also include user software applications. The software can be implemented as a single application or as multiple applications. In general, the software can, when loaded into processing system 501 and executed, transform processing system 501 from a general-purpose device into a special-purpose device customized as described herein.

Figure 6:
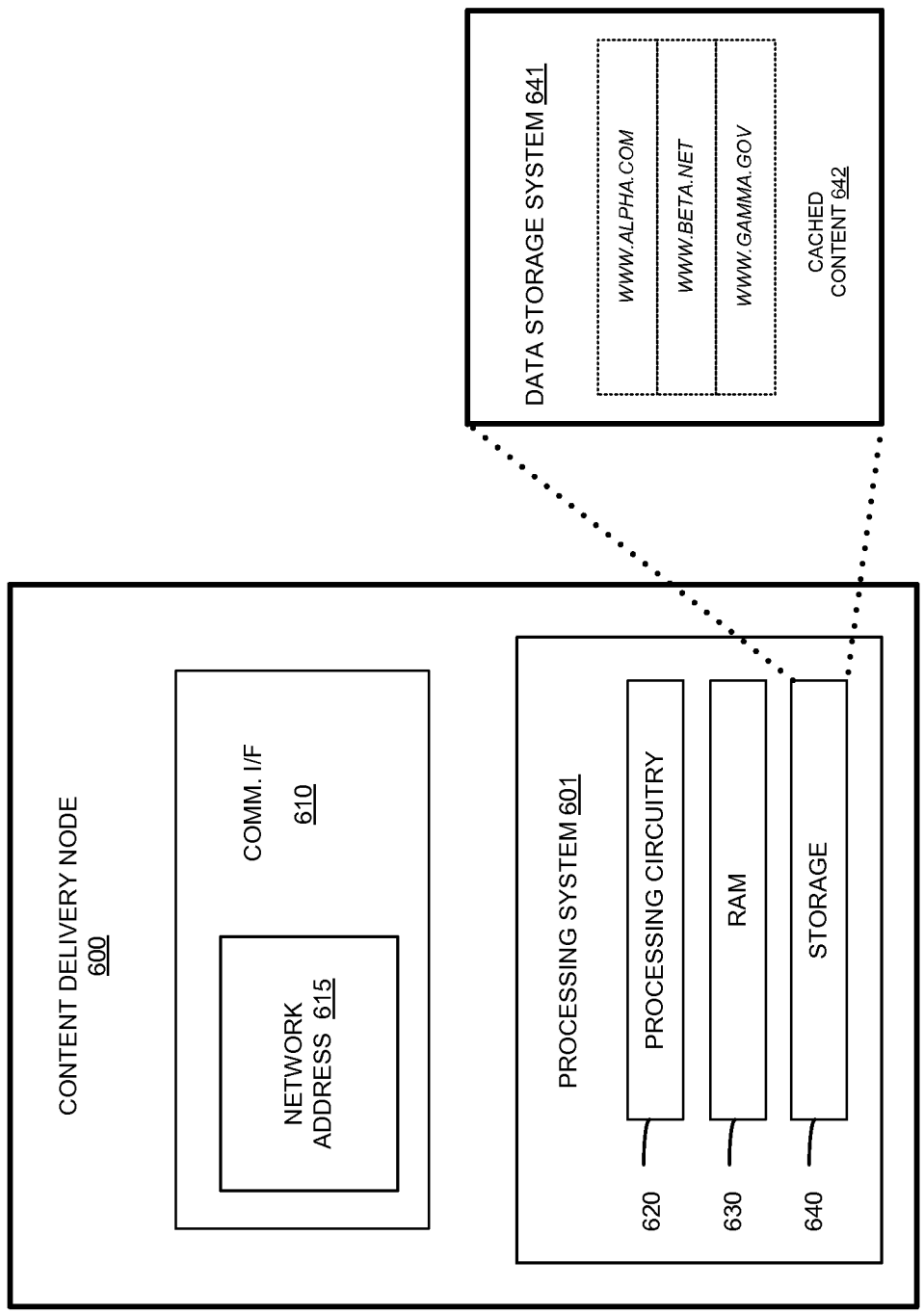
FIG. 6 is block diagram illustrating a content delivery node.

FIG. 6 illustrates the internal configuration of content delivery node (CDN) 600. CDN 600 may be an implementation of CDNs 120, 130, 320 and 330. CDNs 120, 130, 320 and 330 may have different internal configurations. CDN 600 includes communication interface 610, and processing system 601. Processing system 601 includes processing circuitry 620, RAM 630, and storage 640. In operation, processing system 601 is operatively linked to communication interface 610, RAM 630, and storage 640 by processing circuitry 620. Processing system 601 is capable of executing software stored in RAM 630 or storage 640. When executing the software, processing system 601 drives CDN 600 to operate as described herein. CDN 600 can also include other elements, such as user interfaces, computer systems, databases, distributed storage and processing elements, and the like.

Processing system 601 can be implemented within a single processing device but can also be distributed across multiple processing devices or sub-systems that cooperate in executing program instructions. Examples of processing system 601 include general purpose central processing units, microprocessors, application specific processors, and logic devices, as well as any other type of processing device.

Communication interface 610 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 610 include network interface card equipment, transceivers, modems, and other communication circuitry. Communication interface 610 has network address 615 for sending and receiving data over a network. Network address 615 may be an IP address.

RAM 630 and storage 640 together can comprise a data storage system, such as in data storage system 641, although variations are possible. RAM 630 and storage 640 can each comprise any non-transitory storage media readable by processing system 601 and capable of storing software. RAM 630 can include volatile and nonvolatile, removable and non-removable media implemented in any method or technology for storage of information, such as computer readable instructions, data structures, program modules, or other data. Storage 640 can include non-volatile storage media, such as solid state storage media, flash memory, or solid state storage system. RAM 630 and storage 640 can each be implemented as a single storage device but can also be implemented across multiple storage devices or subsystems. RAM 630 and storage 640 can each comprise additional elements, such as controllers, capable of communicating with processing system 601. In some implementations, the storage media can be a non-transitory storage media.

Software stored on or in RAM 630 or storage 640 can comprise computer program instructions, firmware, or some other form of machine-readable processing instructions having processes that when executed by processing system 601 direct CDN 600 to operate as described herein. For example, software drives CDN 600 to receive requests for content, determine if the content is stored in CDN 600, retrieve content from origin servers, transfer content to end user devices, and manage data storage systems for handling and storing the content, among other operations. The software can also include user software applications. The software can be implemented as a single application or as multiple applications. In general, the software can, when loaded into processing system 601 and executed, transform processing system 601 from a general-purpose device into a special-purpose device customized as described herein.

Content includes provided content, such as the web content examples in FIG. 1B, which can include text, data, pictures, video, audio, web pages, scripting, code, dynamic content, or other network content. End user devices 140 and 240-244 can be a user device, subscriber equipment, customer equipment, access terminal, smartphone, personal digital assistant (PDA), computer, tablet computing device, e-book, Internet appliance, media player, game console, or some other user communication apparatus, including combinations thereof The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a control system to select a content delivery node in a content delivery system, the method comprising:
   caching content from a plurality of origin servers on a plurality of content delivery nodes of the content delivery system;
   retrieving first content from an origin server if the first content is not cached in the content delivery system;
   obtaining, from at least a first end user device, performance measurements for data exchanged between the first end user device and the plurality of content delivery nodes, wherein the performance measurements comprise transfer latency measurements of data transferred between the plurality of content delivery nodes and the first end user device;
   receiving a domain name lookup request sent by a second end user device for retrieving the first content cached by the content delivery system on a subset of content delivery nodes within the plurality of content delivery nodes;
responsive to the domain name lookup request:
determining predicted network performance for the second end user device to reach the first content from the plurality of content delivery nodes by identifying the predicted network performance based on:
the performance measurements for the first end user device,
an internet service provider shared by both the first end user device and the second end user device, and
data associated with the first content;
selecting a target content delivery node among the content delivery nodes for the second end user device to reach the first content based on the predicted network performance; and
transferring a network address associated with the target content delivery node for receipt by the second end user device.

2. The method of claim 1, wherein the performance measurements further comprise packet transit time measurements of the first content or a second content transferred between the subset of content delivery nodes and the first end user device.

3. The method of claim 1, further comprising: responsive to the domain name lookup request, correlating a network characteristic of the second end user device with a network characteristic of the first end user device by identifying a network address range associated with the first end user device and determining if a network address of the second end user device corresponds to the network address range associated with the first end user device.

4. The method of claim 1, wherein the performance measurements are made using ICMP pings.

5. A content delivery system, comprising:
a plurality of content delivery nodes each with a processing system configured to cache content from an origin server, the content nodes retrieve a first content from origin servers if the first content is not cached and transfer the first content for delivery to a plurality of end user devices;
a control system communicatively coupled to the plurality of content delivery nodes and with a processing system configured to obtain from a first end user device, performance measurements for data exchanged between the first end user device and the plurality of content delivery nodes of the content delivery system, wherein the performance measurements comprise transfer latency measurements of the data transferred between the first end user device and the plurality of content delivery nodes;
the control system configured to:
receive a domain name lookup request issued by a second end user device for retrieving the first content cached by the content delivery system on a subset of content delivery nodes within the plurality of content delivery nodes;
responsive to the domain name lookup request:
determine predicted network performance for the second end user device to reach the first content from the subset of content delivery nodes by identifying the predicted network performance based on:
the performance measurements for the first end user device;
a common internet service provider shared by both the first end user device and the second end user device share, and
data associated with the first content;
select a target content delivery node among the subset of content delivery nodes for the second end user device to reach the first content based on at least the predicted network performance; and
transfer a network address associated with the target content delivery node for receipt by the second end user device.

6. The content delivery system of claim 5, wherein the performance measurements further comprise packet transit time measurements of the first content or a second content transferred between the subset of content delivery nodes and the first end user device.

7. The content delivery system of claim 5, wherein responsive to the domain name lookup request, the control system is further configured to correlate a network characteristic of the second end user device with a network characteristic of the first end user device by identifying a network address range associated with the first end user device and determining if a network address of the second end user device corresponds to the network address range associated with the first end user device.

8. The content delivery system of claim 5, wherein the performance measurements are made using ICMP pings.

9. A content delivery system, comprising:
a first content delivery node in a plurality of content delivery nodes with a processing system configured to cache content from an origin server, the content nodes retrieve a first content from origin servers if the first content is not cached and transfer the first content for delivery to a plurality of end user devices;
a selected content delivery node in a plurality of content delivery nodes;
a control system communicatively coupled to the first content delivery node and with a processing system configured to obtain first performance measurements made by the first content delivery node related to data exchanged between a first end user device and the first content delivery node, and second performance measurements made by the first end user device related to the data exchanged between the first end user device and the first content delivery node;
the control system configured to receive a domain name lookup request issued by a second end user device for retrieving the first content cached by the content delivery system;
responsive to the domain name lookup request, the control system configured to:
identify the selected content delivery node based at least on the first performance measurements and the second performance measurements; and
transfer a network address associated with the selected content delivery node for receipt by the second end user device.

10. The content delivery system of claim 9, wherein the first performance measurements comprise latency.

11. The content delivery system of claim 9, wherein second performance measurements comprise price.

12. The content delivery system of claim 9, wherein the first performance measurements are made using content requests.

13. The content delivery system of claim 9, wherein the second performance measurements are made using content requests.

\* \* \* \* \*